UNITED STATES PATENT OFFICE.

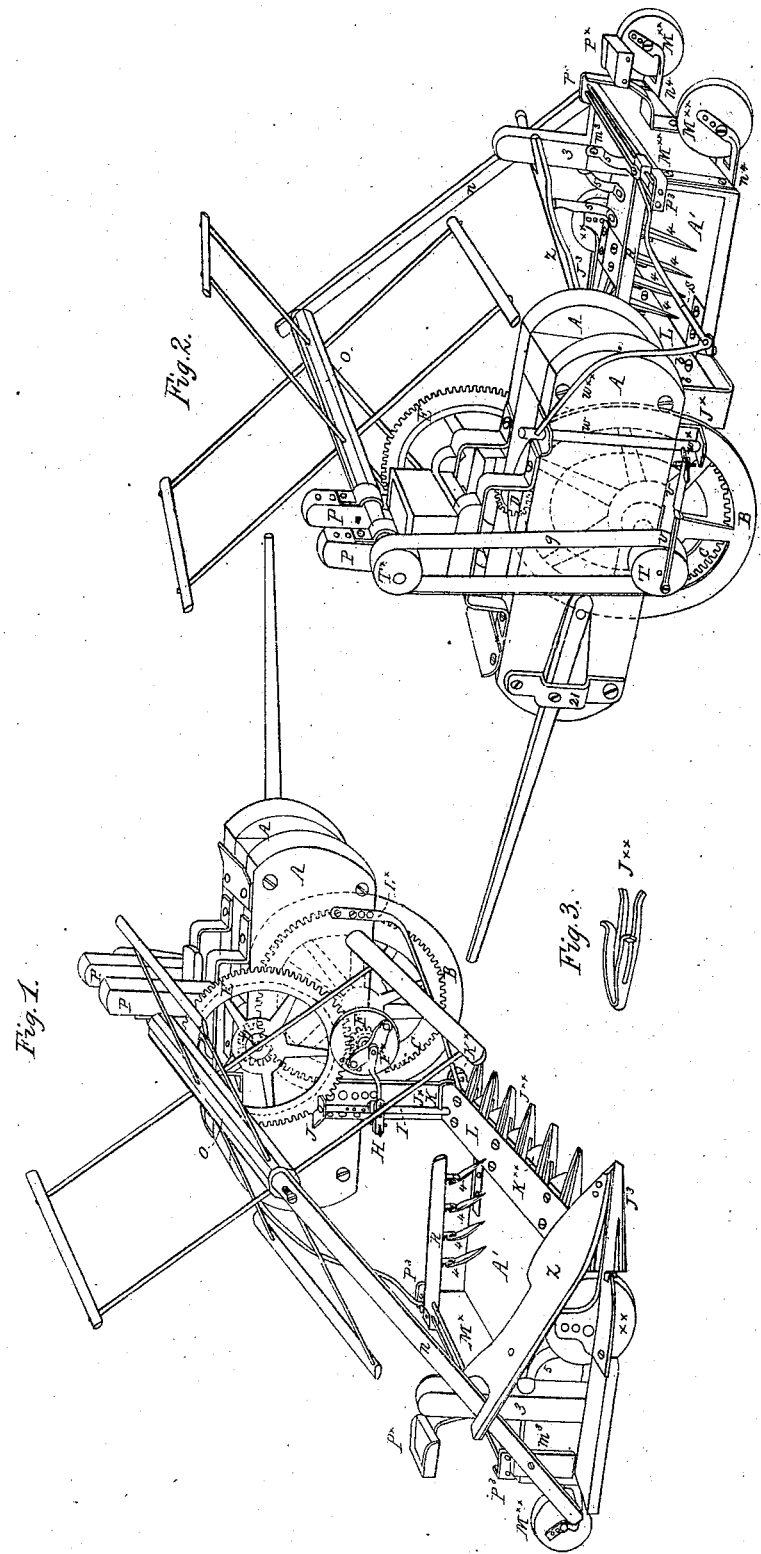

WILLIAM SCHNEBLY AND THOMAS SCHNEBLY, OF NEW YORK, N. Y.

IMPROVEMENT IN GRAIN AND GRASS HARVESTERS.

Specification forming part of Letters Patent No. 10,326, dated December 20, 1853.

*To all whom it may concern:*

Be it known that we, WILLIAM SCHNEBLY and THOMAS SCHNEBLY, of the city of New York, and State of New York, have invented Improvements in Reaping and Mowing Machines; and we do hereby declare that the following is a full and exact description thereof, reference being had to the accompanying drawings and letters of reference marked thereon.

Our improvements consist, first, in changing the gearing from that of bevel-wheels to that of spur-wheels, and placing the main driving wheel and other gearing in advance of the cutters, instead of being behind, as in our original patent; secondly, by producing the action or motion of the cutters with two spur-wheels and two pinions only, one pinion working on the outside of the frame on the end of the main shaft or otherwise with an adjustable crank-pin, and the other pinion on the inside of the frame; thirdly, in the use of a perpendicular shaft standing on the cutter-bar, with an adjustable arm and a fixed arm standing at right angles to each other, by which we can readily change the machine from that of a reaper to that of a mower; fourthly, in bringing the driving-wheel in close proximity to the end of the cutter-bar by using a perpendicular adjustable stancheon-iron, to which it is fastened, which enables us to clear the way for the main wheel in the next round when mowing much more readily, and leaving no mowed grass between the wheel and the first cutter, which cannot be accomplished so successively when the distance is as great as it is in other mowing-machines, as this duty is performed by an inclined board at the extreme outer end of the cutter-bar, which throws the cut grass inward as the machine advances, also preventing the clogging of the machine and diminishing the side draft, as the resistance is closer to the fulcrum or main wheel; fifth, in placing a roller at the end of the cutter-bar in an enlarged guard or finger to support the weight of the cutter-bar, either in reaping or mowing, which greatly relieves the heavy drag which is experienced without it. Other rollers have been used in other machines, but not for this purpose at the end of the cutter-bar. Sixthly, in being able to convert the machine into a mower from that of a reaper by detaching the platform and lowering the perpendicular stanchion-iron by simply withdrawing a few bolts; seventhly, in the method of constructing our guards or fingers, which were usually made in parts, which are now formed of one piece of plate or cast iron, and can be attached to the cutter-bar without being under the necessity of drilling holes in them; eighthly, in the employment of two rollers at the rear of the platform, made adjustable, to support the platform behind and to permit the machine to drive and turn readily; ninthly, in the use of a self-raking apparatus located above the platform, free from all liability to be clogged or interrupted by stubbles or grass lodging on the platform, which enables us to deposit the grain on the ground in the best manner for binding; tenthly, in the use of an adjustable seat located on the top of the frame, supporting the reel-shaft at one end, and affording a comfortable and safe seat for the driver; eleventh, in the use of an inclined board standing on the end of the enlarged guard or finger at the end of the cutter-bar and resting against a perpendicular on the platform at the other end, which is designed to cover the roller, and to act, in combination with a series of inclined planes on the platform behind or under it, to give direction to the falling grain, permitting the rake to get a clean sweep in starting from that side of the platform; lastly, in being able to attach a comfortable seat in the rear of the platform supported by two rollers below, so that in case of any accident to the self-acting rake a man may occupy it to perform that duty without any unnatural physical effort.

We now proceed to give a full and perfect description of the method of constructing our improved reaping and mowing machine, which is admitted to be the most substantial and useful machine now in the field, for the benefit of the public.

Fig. 1 represents a perspective view.

A A represent the frame, of suitable material, sufficiently deep to bring the spur wheels and pinions in gear when the shaft of the main wheel is placed at the bottom and the shaft of the other spur-wheel and pinion is placed on the upper edge of the same.

B represents the main driving-wheel, which runs on the ground inside of the frame A A.

C is the first spur-wheel, located on the shaft with B, also between or inside of the frame.

D is the first pinion above, gearing into the wheel C, also inside of the frame.

E is the second spur-wheel, on the same shaft with pinion D at the top of the frame, and rotates on the outside of the frame A A.

F is the second pinion, located on the end of the main shaft below, on the outside of the frame, and gears into the spur-wheel E above. This pinion F may be located at any other point, if necessary, so as to keep in the range of the spur-wheel into which it gears. The diameters of the spur-wheels and pinions are so proportioned as to give from twenty-five to thirty-five revolutions of the pinion F while the wheel on the ground makes one turn. Thus by four wheels only being spur-gearing we produce the motions of the cutters and other parts of the machine, which is entirely different from all other machines which have come to our knowledge. The pinion F on the main shaft has an adjustable crank-pin, $F^x$. This is made in the most mechanical manner. We have a flange, F, cast on the side of the pinion F, sufficiently large to enable us to attach a movable plate, which is fixed at one end on a center, the other end having a hole by which it is bolted to the holes in the flange F, which are described from the same center, and consequently correspond. This adjustable crank-pin $F^x$ may be made to pass to either side of the center of the pinion F, and may be used to increase or diminish the length of the lateral motion of the cutters, as in practice we found that grain did not require as much motion as grass, which makes this a very important arrangement. The pinion F is confined on the end of the shaft by a recessed washer screwed fast to the end of the shaft, allowing sufficient space not to crowd the pinion.

G is a horizontal connecting-rod, jointed in such manner as to adapt it to the duty performed. Said rod is connected at one end to the adjustable crank-pin $F^x$ and at the other end to the adjustable arm H, which is placed on the perpendicular shaft I. Said shaft I has a rocking motion given to it instead of a rotary motion, and stands with its lower end on the cutter bar or plate, which covers it, and is supported at the top by an attachment to the stanchion-iron at J. By a series of holes in the perpendicular rocking shaft I the arm H is always kept in a proper position by a bolt maintaining a straight-line motion of the connecting-rod G. When the cutter-bar is raised or lowered for grain or grass cutting, the arm H is confined or secured to the shaft I by a set-screw or its equivalent. K is another arm, permanently fixed on the lower end of the shaft I at right angles to the arm H above.

$K^x$ is a straight-line connecting-rod, which unites the cutters $K^{xx}$ with the arm K. This arrangement is entirely different from all the reaping and mowing machines exhibited at the great fair in October last—viz., Hazzy's, Forebush's, Katchum's, Maury's, Athim's, Burrell's, McCormick's, &c.—as all have bevel-gear and many of them oblique rods working not in a straight line with the cutters, producing a great cross-strain to all the parts, which we have entirely obviated. In our original and late patents we made our guards or fingers in two parts, which were riveted together, and holes drilled in them to confine them to the cutter-bar. We now form our hollow guards or fingers $J^{xx}$ of triangular shape, from one piece, without any drilling, and instead of screwing them fast to the cutter-bar we recess the bar for the parallel back parts of the fingers and cover them wholly or in part by a plate which is secured fast to the cutter-bar. Thus the whole series of hollow guards $J^{xx}$, of triangular shape, are confined securely at much less expense and trouble. We place our fingers closer to each other than in all the rest of the machines, for the purpose of employing a greater number of cutters and to divide the duty between them, instead of imposing so much on a less number of cutters, which in practice is a great economy of power required to work the machine. By placing our fingers nearer together we can reduce the lateral motion of our cutters and not pass them through entirely from the center of one to the center of the other, as is usually done in all other machines, which prevents the disposition to clog the fingers with particles of grass, grain, &c., and gives us a very great advantage in lodged grass or grain, or under any other circumstance, as in our arrangement we only throw the edge of our cutters into the slots on one side of our hollow triangular guard or finger $J^{xx}$ and not all the way through.

Fig. 3 represents the hollow triangular guard or finger $J^{xx}$ in a reversed position, being detached, the parallel parts behind being recessed into the cutter-bar and secured as described, except the enlarged one $J^3$, at the end of the cutter-bar, which is bolted fast, and contains the roller $x\ x$. Said enlarged guard or finger has parts raised up on either side, with a series of holes to permit the raising and lowering of the cutter-bar. We also continue the flanges of this guard $J^3$ far enough back to connect it to the platform, which secures it to the cutter-bar on that side.

J is a collar to support the upper end of the shaft I.

$J^x$ is a perpendicular adjustable stanchion-iron, having a series of holes, by which it is bolted fast to the frame A A, and by which we are permitted to raise or lower it for grain or grass purposes. At the lower end of said perpendicular adjustable stanchion-iron $J^x$ a corresponding piece is formed at right angles, to which we secure the cutter-bar by means of bolts 6 6.

L is a plate, wholly or in part covering the cutter-bar and parallel parts of the fingers $J^{xx}$, and confining them substantially to the bar.

$L^x$ is a brace bolted to the cutter-bar, having a series of holes in the end next to the frame A A to permit the bar and cutters to be raised or lowered at pleasure, the brace $L^x$ always maintaining its relative position either in reaping or mowing.

$K^{xx}$ is the double-edged cutter, and may be made of one piece or of parts, and worked into the slots of the hollow triangular guards or figures, as in our late patent. The platform A' for receiving the cut grain is made of a frame covered with light boards or otherwise, from five to six feet wide. The platform A' is connected with the cutter-bar on the side next to the frame A A by means of a plate and bolts securing it, and on the other side by the enlarged guard $J^3$ in rear of the roller $x\ x$. By this arrangement we can readily convert the machine from a reaper to a mower by displacing the platform and parts not necessary for mowing. At the rear end of the platform we raise a guard-board, $M^\times$, to prevent the grain from slipping off as the machine is progressing. The rear end of the platform is supported by means of two adjustable rollers, $M^{\times\times}\ M^{\times\times}$, which have suitable contrivances with a series of holes in them to permit us to lower or raise it at pleasure. The rollers $M^{\times\times}\ M^{\times\times}$ are made to work in self-adjusting levers, $N^4\ N^4$, on a center which is fixed on the under side of the platform, permitting the machine to turn or guide freely as the front of the platform is supported by the ground-wheel B and the roller $x\ x$ at the end of the cutter-bar. On the side of the platform next to the enlarged guard $J^3$ we raise up another guard-board, $M^3$, sufficiently high to answer the purpose required, in rear of the roller $x\ x$, and as a cover to it; and, for the purpose of giving direction to the grain as it is falling on the platform, we place an inclined board, Z, which has the lower end pointed and standing on the point of the enlarged guard $J^3$, the other end of which rests against the upright 3—the inner edge of this board Z in combination with a series of inclined rods, 5 5 5, one end of each being made fast to the platform and the other ends to the guard-board $M^3$. Upright 3 and the board Z serve the purpose of causing the cut grain to fall in such manner as to permit the rake R to perform its duty with more success in discharging it from the platform. This plan gives the rake an opportunity to get behind the grain on the platform and to make a clean sweep as it passes over the platform.

When the machine is used for mowing grass, the roller $x\ x$ is retained, which supports the cutter-bar and relieves the machine from the heavy drag and side draft which is experienced in other mowing-machines without it. The board G, or its equivalent, can be used when mowing to throw the cut grass partially in windrow, if it be set up on its edge and inclined inward and fastened to the end of the cutter-bar or enlarged guard $J^3$, so as to clear a space for the main wheel B in going the next round, and prevent the cut grass from clogging the machine; also, as the perpendicular stanchion-iron $J^\times$ brings the first cutter or finger in close proximity to the main ground-wheel B, leaving only a narrow space to be cleared. We here gain a great advantage over other machines, as the resistance is brought nearer to the fulcrum B. By this method we also bring the machine into a more compact and durable form, all of which points are very desirable. The reel-brace $n$ is bolted behind to the guard-board $M^3$. This reel-brace $n$ is made adjustable, and can be raised or lowered, advanced or drawn back, as the case may be, and is supported on the upright 3 by means of a bolt. Said brace $n$ is used to support the outer end of the reel-shaft $o$, while the other end of said shaft is supported by the adjustable and movable seat P P, which is arranged with iron fixtures—two on each side. (Seen in the drawings and model.) These iron fixtures drop down below the top of the frame A A, and by means of bolts confine the seat at any desired point, the frame A A having holes to receive the bolts. By this method we can slide the seat forward or back for the twofold purpose of balancing the machine and adjusting the reel at any required position, which rests on the top of the frame A A, and which also affords a safe and comfortable seat for the driver. We use the common reel, made as light as possible, and revolves as fast as the ground-wheel.

$P^\times$ is an accommodation seat, and, in combination with the rollers $M^{\times\times}\ M^{\times\times}$, may be used to convey a visitor to witness the operation, or may be used in case of any break of the self-acting valve, giving the man an easy and natural position. Many kinds of seats have been used by others, but we claim this seat in its peculiar combination with the platform supported by adjustable rollers, which is different from all other fixtures which we have seen intended as seats in other machines. On the rear of the platform we attach suitable stanchion-irons, $P^3$, which are to support guide-rods 2 2, laid parallel to each other above the top edge of the guard-board $M^\times$, and used to guide the self-acting rake.

R is a self-acting rake, with a series of jointed fingers, 4 4 4, which scrape the grain from the platform and deposit it in sheaves on the side of the machine or platform ready for binding. The rake R, with its jointed fingers 4 4 4, may have a regular and continuous motion produced by a crank, as shown in the pulley T in Fig. 2, or may have an irregular motion, being at rest for a period and then quickly moved, which can be effected by various mechanical contrivances when required. We have also thought of a plan to raise the rake up in its passage to the side of the machine next to the standing grain, so as to clear the falling cut grain entirely, then drop down and scrape it off; but as the present plan is simple and good we have not applied it. The fingers 4 4 4 are so jointed that when they return back to the inclined rods 5 5 5 and board Z they bend up and slide over the grain lying on the platform, and when they get back to their extreme distance of motion, and within the range of the inclined rods 5 5 5 and board Z, they then drop down into a perpendicular position by their own weight, and in their passage over the platform perform their duty. S is a connecting-rod attached to the rake, and communicates motion to it.

In Fig. 2, which gives another perspective, we have represented other parts more clearly. T is a pulley on the end of the main shaft on the outside of the frame A A. From this pulley we communicate motion to the reel by a belt, 9, running over a pulley, $T^\times$, above on the end of the reel-shaft $o$. We also communicate motion to the valve from this pulley T. This end of the reel-shaft is supported by the adjustable seat P P, and is arranged with a series of holes in the perpendiculars or back of the seat P P, that we can raise or lower the reel-shaft or move it forward or back on the top of the frame A A, with the movable seat. This arrangement would enable us to dispense with the support at the other end—that is, the brace $n$—if we desired to do so, as the uprights on the seat P P are so wide apart as to afford sufficient bearing to the reel alone, having the pulley also on the outside of the bearings or journals, in combination with the brace $n$ at the other end, and give it any desirable position. In the pulley T a crank-pin is fixed, or its equivalent, from which the motion is communicated to the rake by means of a connecting-rod, $v\ v$, so constructed as to perform its office with joints playing perpendicularly and horizontally. $w$ is a perpendicular shaft located on the outside of the frame A A. Near the end toward the platform on this perpendicular shaft we have an arm or lever, $w^\times$, which is connected with the rod $v\ v$. At the top of the shaft $w$ we have a long lever or arm, $w^{\times\times}$, which stands at right angles with the arm $w^\times$ below. At the end of the lever $w^{\times\times}$ we connect the rod 5, which also connects with the rake R, and thus by the revolution of the pulley T (or crank) or grooved wheel, which is not represented on the main shaft, we give motion to the rake, &c. By this arrangement we gain a great advantage, as we have thrown a portion of the resistance on the other side of the frame A A and fulcrum B, which equalizes the side draft and reduces the power necessary to propel the machine and keeping everything in a compact form. On the front end of the frame we have an iron, $Z'$, which receives the tongue by which the machine is drawn or guided. This piece $Z'$ is bolted on the outside of the frame when used as a reaper, and changed to the other side when used as a mower. The advantage gained by this plan is that the horses work or apply their power more directly on the cutters, where the resistance is, and consequently diminish the side strain, which is felt more sensibly in cutting grass than in cutting grain. In converting this machine into a mower from that of a reaper we have only to remove a few bolts and displace the platform, &c., when we have the seat P P, the gearing, and cutters, which make one of the most substantial and effectual mowers, capable of doing work with less distress to horses and driver than in any way heretofore practiced.

What we claim, and desire to secure as our improvement, is—

1. The method of arranging the gear, in combination with the movable plate to which the crank-pin $F^\times$ is fastened, said movable plate being located on the flange F of the second pinion, by which method we can increase or diminish the lateral distance of the motion of the cutters, substantially as described.

2. The method of constructing the hollow guard-fingers, each one being a single piece only, substantially as described.

3. The self-acting rake with jointed fingers, in combination with the guide-rods upon which it is made to slide back and forth, substantially as described.

WM. SCHNEBLY.
THOS. SCHNEBLY.

Witnesses:
JOHN SCANLETT,
EDMUND M. EVANS,